Dec. 7, 1937. R. B. MILLER 2,101,505
WHEEL FOR MOTOR VEHICLES
Original Filed March 31, 1932 2 Sheets-Sheet 1

Inventor
Richard B. Miller

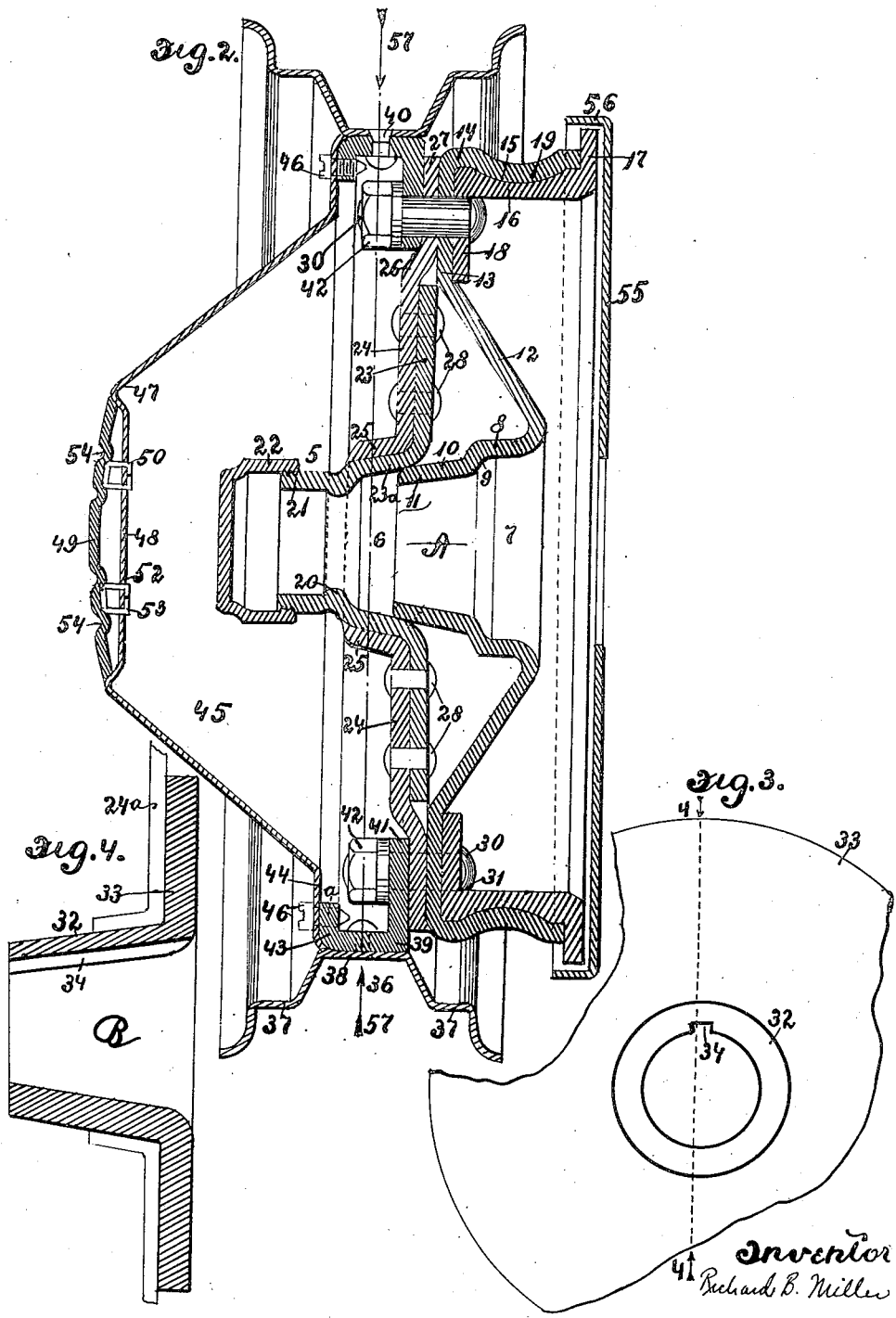

Patented Dec. 7, 1937

2,101,505

UNITED STATES PATENT OFFICE 2,101,505

WHEEL FOR MOTOR VEHICLES

Richard B. Miller, Detroit, Mich., assignor, by mesne assignments, of fifty per cent to Bernice Miller, Cleveland Heights, Ohio, and fifty per cent to Florence R. Magid, Brooklyn, N. Y.

Application March 31, 1932, Serial No. 602,122
Renewed December 29, 1934

26 Claims. (Cl. 301—6)

This invention relates to wheels for motor vehicles and is particularly, although not necessarily concerned with wheels for light duty vehicles, such as passenger cars, light duty trucks and analogous vehicles.

An object of the invention is to provide a motor vehicle wheel of the all-metal type embodying parts which may be made of sheet metal stampings without sacrificing strength necessary to withstand the duties to which the wheel may be subjected while in service on the road.

Another object of the invention is to provide a wheel assembly embodying parts which are relatively light in weight and which, when assembled, provide a wheel which is particularly adapted for the modern low pressure tire of relatively large cross sectional diameter, the wheel in effect simulating an enlarged hub when viewed from the outward side thereof.

Another object of the invention is to provide a wheel assembly for motor vehicles which embodies parts, in general comprised of sheet metal stampings, which when assembled are so arranged relatively to one another that the load stresses are applied in a substantially straight line from the periphery of the wheel to the hub portion thereof, the parts being also capable of withstanding severe torque thrusts.

Another object of the invention is to provide a wheel of the class specified which may be readily adapted for either a front or rear wheel mounting.

Another object of the invention is to provide a wheel assembly which is particularly adapted for tires of the lower pressure type, the wheel embodying parts which are relatively light in weight and capable of withstanding severe load stresses while at the same time having features which tend to produce symmetry and beauty of design.

Another object of the invention is to provide a wheel assembly embodying parts which are relatively light in weight and which, when assembled, provide a wheel which is particularly equipped with an outboard axially-outwardly contoured shell member, having a continuous, non-centrally open radial outboard-side wall, radially-outwardly extending to the formation of a frustocone terminating in a peripheral portion which is detachably fastened to the outboard-side of the assembly tire-rim clamping means, the said radial outboard-side wall being in association with a decorative member.

Another object of the invention is to provide a wheel assembly embodying parts which are relatively light in weight and which, when assembled, provide a wheel which is particularly equipped with an outboard shell member of an axially-outwardly pressed contour having a diametral body free from engagement with any part of the vehicle with which the wheel assembly is ordinarily equipped, but it is detachably fastened to outboard-side means of the tire-rim of the assembly, thereby forming a continuous centrally closed shell member.

The foregoing and other objects and advantages will become apparent in view of the following description taken in conjunction with the drawings, wherein:

Fig. 2 is a substantially central transverse sectional view taken on the line 2—2, Fig. 1;

Fig. 3 is a fragmentary view of a hub member which is used with the assembly when the wheel is to be applied to a driven axle; and Fig. 4 is a sectional view taken on the line 4—4, Fig. 3.

Figure 1:
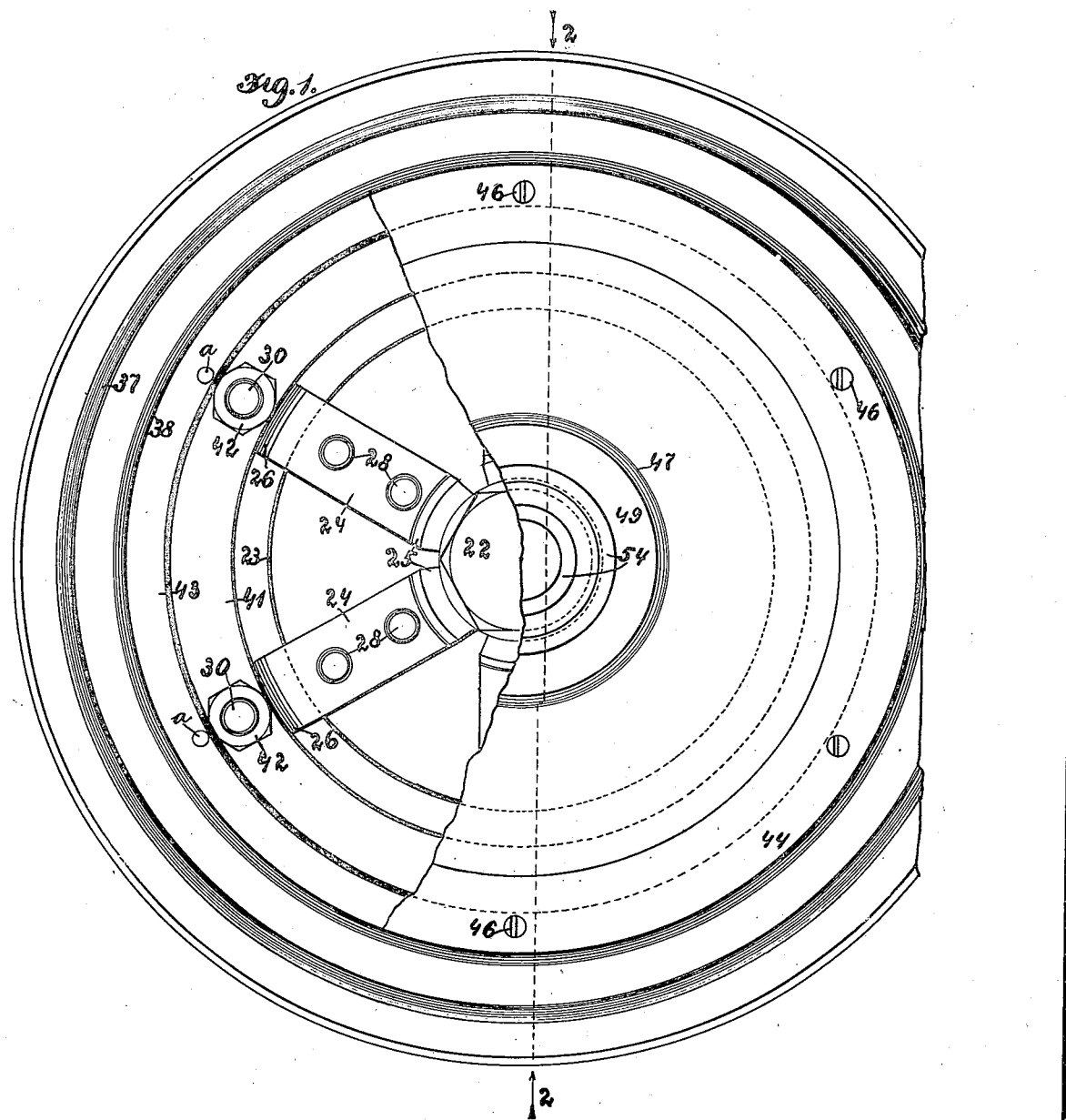
Figure 1 is a view in outboard side elevation of a wheel embodying the features of the invention with the shell member which forms part of the wheel assembly broken away to show the interior construction.

The wheel, as shown in cross section in Fig. 2, is of the type adapted for the front or non-driven axle shaft of a motor vehicle. As will be apparent, the assembly embodies parts which are in the main formed of sheet metal stampings, such type of wheel being shown in my copending application Serial No. 238,638, filed December 8, 1927, over which the present wheel may be considered in the nature of an improvement.

Referring in detail to the drawings, the reference numeral 5 designates the central or nave assembly provided with a hub barrel generally indicated at 6 and 7, the said barrel being formed of separate parts which will be more fully described. The reference character A designates the bore of the barrel which is adapted to house the wheel bearings, the latter in the present instance being of the front or non-driven axle type. That part of the hub barrel which is generally indicated at 7 comprises a sheet metal stamping formed with an annular enlarged portion 8 terminating in a retaining shoulder 9, which serves as a housing for the wheel bearings, the stamping also being formed with a tapered portion 10 which, as shown, is partly telescoped into the portion 6 of the hub barrel as at 11. The stamping is formed with a web wall 12 which is preferably inclined radially to provide, in conjunction with the remaining parts, a reinforced and rigid construction, the said web wall 12 terminating in a substantially radial wall 13 which in turn is formed with a peripheral backing flange 14 having an inner face 15 adapted to receive a hardened brake contacting member 16. The brake contacting member 16 may be formed of any hard wear-resisting material suitable for effective braking service. This brake contacting member 16 is preferably formed with a peripheral flange 17 and a reduced attaching web 18 which is of such dimensions as to produce a relatively snug fit within the offset portion of the web wall 12 where it merges with the substantially radial wall 13, thereby providing a cooperatively reinforced assembly. To retain the hard metal wear resisting brake member 16 in position, it is preferred to form said member with an annular concave peripheral face and to form the backing flange 14 with a like portion or inwardly rolled depression, thereby locking the parts against displacement.

The outboard member of the hub assembly, which is generally indicated at 6, is also in this instance comprised of a sheet metal stamping. This portion 6 is formed with an annular inrolled bead 20 which defines the end of the bearing housing. The outer end of the stamping 6 is threaded as at 21 to detachably receive a hub cap or grease-retaining member 22. The portion 6 of the hub barrel is provided with a substantially radially-extending web wall 23 and an annular flared portion 23a adapted to telescope over the portion 11 of the member generally indicated at 7, the parts 6 and 7 thus cooperating to complete the hub barrel. As a cooperative reinforcing means and for locking the parts in assembled position, a plurality of radially-extending fingers or brackets 24 are provided, said fingers at their radial inner ends terminating in out-turned portions 25 adapted to lie flush against the portion 23a of the member 6, and at their radial outer extremities, each of said fingers is offset beyond the wall 23 as at 26 and terminates in a substantially radially-extending portion 27. These fingers or brackets 26 are adapted to fit snugly against the outer face of the wall 23 and are rigidly secured thereto in any suitable manner, such as by the rivets 28. The radial outer ends 27 of the fingers 24 are secured in assembled position with the brake contacting member 16 and inboard member 7 by means of locking bolts 30 having one side of the head thereof flattened or sheared as at 31 to permit a snug fit within the angle of said brake contacting member 16, said bolts being peened in position to prevent dislodgment. The threaded ends of the bolts are extended outwardly for a purpose which will hereinafter be described.

In the event it is desired to use the wheel for a driven axle, the outboard member 6 which comprises part of the hub assembly may be substituted by the hub or nave member shown in Figs. 3 and 4. This member may be of suitable forged or hardened material and comprises a hub proper or barrel 32 which is formed with a key-way 34 and a substantially radially-extending web wall 33. The bore of the hub 32 is indicated at B. The fingers or brackets which are equivalent to those indicated at 24 in Fig. 2 are designated in Fig. 4 by 24a. The member shown in Figs. 3 and 4 may be easily substituted for the member generally indicated at 6 in Fig. 2 so that the change from the front to rear wheel or vice versa may be effected without an entire change of parts. Thus, should it be desired to replace the rear wheel by a front wheel or vice versa, it is only necessary to change the outboard member which comprises part of the central hub or nave assembly.

From the foregoing, it will be seen that the main wheel-supporting assembly comprises parts which in the main are formed of sheet metal stampings, said parts being assembled in such manner as to promote rigidity and maximum strength while at the same time being relatively light in weight.

While any suitable type of rim may be employed with the improved wheel assembly, I preferably use the drop center type of rim and permanently associate the same with a rim-mounting member which is particularly adapted for the present assembly. The rim 36, as here shown, comprises side walls 37 and a base 38. An annular angle-shaped rim-mounting member or ring, generally indicated at 39, is employed in connection with the rim to serve as a mounting member therefor, the transverse flange of the ring 39 being permanently secured to the base 38 of the rim by means of rivets or like members 40, while the radially-extending flange 41 of said ring is demountably secured on the bolts 30 by means of lock nuts 42. When the flange 39 is so mounted, its radial inner edge engages the shouldered portion 26 of the bracket fingers 24 or 24a, as the case may be. The transverse flange of the ring 39 terminates on its outboard side in a radially inwardly turned shell-mounting flange 43.

To complete the symmetrical contour of the wheel and protect the interior thereof and also to simulate in effect an enlarged hub disk of pleasing design, a continuous non-centrally open shell member generally indicated at 45 is detachably secured to the outboard side of the wheel and encompasses the entire area of the wheel within the confines of the rim 36. This shell member may be formed of relatively thin sheet metal and has a peripheral substantially radially-extending portion 44 which snugly engages against the flange 43 of the ring 39 and is preferably detachably secured thereto by means of fillister screws 46 which are threaded into holes a formed in the flange 43. The body of the shell 45 is preferably of substantially frustro-conical shape and is formed at its apex with an annular depression defining the bead 47. While not essential to the construction of the shell, I preferably employ in conjunction therewith an ornamental cap member 49 which is provided with attaching staples or analogous members 50 which engage in openings 52 formed in the end wall 48 of the shell and have their ends peened or bent over as at 53. To give a decorative effect to the cap 49, I preferably form therein a series of annular depressions 54. It will thus be seen that the shell proper may be formed of sheet metal which may be easily stamped out or worked, while the cap 49 may be formed of any suitable material and given any particular design or imitation.

To prevent ingress of dirt and other foreign substances into the wheel body from the inboard side thereof, I preferably employ a shell or backing plate 55 which is formed with a peripheral flange 56 adapted to telescope over the flange 17 of the hard metal brake contacting member 16. This member may also be in the form of a sheet metal stamping.

From the foregoing, it will be seen that I have provided a wheel assembly which, in the main, is formed of pressed sheet metal parts. These parts, when assembled, constitute a strongly reinforced construction wherein the load stresses are applied in a substantially straight line from the rim-mounting bracket to the hub of the wheel, as indicated by the arrows 57 in Fig. 2 and the dotted lines connecting said arrows. The assembly is particularly adapted for the modern low pressure type of tire. The shell 45 may be easily stamped out in various designs, it being preferred to give it the form shown so that the wheel in effect simulates a large hub member of the disk type. Preferably, the shell 45 may be formed of axially-outwardly frusto-conical contour, with the decorative member 49 in association with the radial wall 48 constituting the continuous closed apex thereof, the inboard-side of the shell as a whole being free from engagement with any part of the vehicle with which the wheel assembly is equipped for service and the assembled parts of the latter wheel assembly, but it is preferably detachably secured to the outboard side of the demountable tire-rim and its mounting means, thereby to completely enclose diametrically the parts which form the outboard side of the assembled members in their associated positions one with another, and preventing ingress of foreign substances into the interior thereof and completing the outboard symmetry of the wheel assembly. The wheel assembly as a whole is completed as shown from sheet metal stamped to configuration for the purpose of affording means for forming the parts to embody therein such mechanical and artistic curved and arched lines that the conventional hub is eliminated from the finished structure, owing to which embodiments and elimination of the conventional hub the wheel assembly is strong, light, economically produced, and provided with features of design that the heavy and clumsy parts of the conventional wheels are unnecessary in the manufacture of the herein described and disclosed wheel assembly, as the latter constitutes a radical departure from the scope of the conventional wheels, to meet the requirements of such wheels for equipment with the modern types of automobiles. With the wheel assembly the conventional wood or steel felloe is eliminated from the completed wheel assembly which is capable to function as a servicing part of a vehicle. The unsprung weight of the latter is thereby decreased and the cost of production of the wheel assembly is minimized in comparison to the cost of production of a wheel assembly assembled with a felloe. The tire-rim is demountably secured direct to the periphery of the brake drum assembly. Owing to such mounting, many parts are eliminated from the wheel assembly. The hardened brake-contacting member also constitutes an important part of the wheel assembly as disclosed. The assembly may be readily adapted for either front or rear wheels of an automobile by simply changing one part thereof, namely the outboard nave member which completes the hub barrel. To demount the rim from the wheel, it is only necessary to remove the shell 45, whereupon access may be had to the lock nuts 42. The entire wheel is well housed, while at the same time a large central open ventilating chamber is formed around the hub barrel.

It is desired to be understood that, owing to the provision of the herein disclosed outboard cover disk member formed with a radial axially pressed central wall in association with which is aligned and to which is fastened an annular ornamental member, the cover disk assembly may be decorated with contrasting finishing colors in the manner that the main body of either member is painted and the associated part is chromium or other plated, which may be reversed in any suitable manner to comply with requirements of automobile manufacturers who equip their products with my wheel assemblies, such advantages would have been eliminated in the manufacture of the wheel assembly had the cover disk been formed with its radial wall constituting the outboard finishing contour and the decorative annular member eliminated from the assembly. Such combination of the integrally formed radial central wall of the main cover disk member and the independently formed annular member and enhances facilities in the manufacture of a highly decorative cover disk assembly to have commercial features of an attractive character. Another advantage is obvious that, owing to fastening of the annular axially arched member to the radial central wall of the main cover disk as decorative means, the central portion thereof is exceedingly reinforced to withstand vibrations caused by movement of the vehicle with which the wheel assembly is equipped, and the cover disk as a whole is, by embodying curved and arched lines collectively forming an axially pressed contour, greatly radially and laterally strengthened.

It will be understood that certain modifications and changes in structure and design may be adopted within the scope of the invention as defined by the appended claims.

I claim:

1. A metal wheel assembly for motor vehicles comprising a drum member of pressed sheet metal formed with a web wall and peripheral flange which constitutes a backing for a brake member proper and a central tubular portion which constitutes part of the hub barrel, a separate outboard hub member adapted to engage over the said tubular portion and complete the hub barrel, a tire rim and a support therefor secured to the rim, means extending radially from said outboard hub member adapted to engage between the said web wall and rim support, and means for securing the said support, radially-extending means and drum member in assembled position with the parts of the hub barrel in partly-telescoped engagement.

2. A metal wheel assembly for motor vehicles comprising a drum member of pressed sheet metal formed with a web wall and a peripheral flange which constitutes a backing for a brake member proper and a central tubular portion which constitutes part of the hub barrel, a separate outboard hub member adapted to engage over the said tubular portion and complete the hub barrel, said outboard hub member being provided with radially-projecting fingers, a tire rim, means secured to said rim for mounting the latter, and means for securing the rim mounting means to said web wall with said fingers clamped therebetween and the parts of the hub barrel in partly telescoped engagement.

3. A metal wheel assembly for motor vehicles comprising a drum member of pressed sheet metal formed with a web wall and a peripheral flange which constitutes a backing for a brake member proper and a central tubular portion which constitutes a part of the hub barrel, said web wall being inclined radially from said central tubular portion toward said flange, said central tubular portion being formed with a bearing-receiving portion, a separate outboard hub member adapted to engage over the said tubular portion and complete the hub barrel, a tire rim, an annular flanged ring secured to said rim, means projecting radially from said hub barrel and adapted to lie flush against the peripheral portion of said wall, and means for securing said flanged ring, outboard hub member, and brake drum member in clamped relation with the parts of the hub barrel in partly telescoped engagement.

4. A metal wheel assembly for motor vehicles comprising a drum member of pressed sheet metal formed with a web wall and a peripheral flange which constitutes a backing for a brake member proper and a central tubular portion which constitutes the inner part of the hub barrel, a brake member of hard wear-resisting material engaged with said flange, a separate outboard hub member adapted to engage over said central tubular portion and complete the hub barrel, said outboard hub member being provided with radially extending fingers, a tire rim, an annular rim-supporting member attached to the rim, and means passed through said hard metal brake member, web wall, fingers, and annular rim support for holding the parts in clamped association with the parts of the hub barrel in partly telescoped engagement.

5. A metal wheel assembly for motor vehicles comprising a drum member of pressed sheet metal formed with a central tubular portion which constitutes part of the hub barrel and a web wall which is inclined radially and terminates in a peripheral flange adapted to form a backing for a brake member, said central tubular portion being formed with a bearing housing, a brake-contacting member of hard wear resisting material engaged in said flange and provided with a web portion adapted to lie flush against said web wall, a separate outboard hub member formed with a central tubular portion adapted to engage over said first-named tubular portion and complete the hub barrel, radially projecting fingers secured to said outboard hub member, a tire rim, an annular ring secured to said rim and formed with a radially-inwardly projecting flange, and means passed through the flange of said brake member, said web wall, fingers, and flange of said ring for securing the parts in clamped association with said central tubular portions in partly telescoped engagement.

6. A wheel assembly for motor vehicles comprising a brake drum member formed with a central tubular portion which constitutes part of the hub barrel and a web wall which is inclined radially from said tubular portion and terminates in a backing portion, a brake member proper of hard wear-resisting material engaged in said backing portion, a separate outboard hub member formed with a central tubular portion adapted to engage over said first named tubular portion and complete the hub barrel, said outboard hub member being formed with a radial flange adapted to engage said web wall at the termination of the incline formed in the latter, fingers secured to said latter flange and projecting radially and adapted to lie flush against the peripheral portion of said web wall, a rim carrying a member provided with a flange adapted to engage the peripheral portions of said fingers, and means for securing the parts in clamped association one with another with the parts of the hub barrel in partly telescoping engagement.

7. In a wheel for motor vehicles, a brake drum member of pressed sheet metal formed with a central tubular portion adapted to form the inner part of the hub barrel, and a peripheral web and flange portion adapted to form a backing for a brake member proper, a brake member of hard wear-resisting material engaged in said backing portion, a separate outboard hub member formed with a central cylindrical portion adapted to engage over said tubular portion and complete the hub barrel, a tire rim, and means for securing the parts in assembled relation with the parts of the hub barrel in partly telescoped engagement.

8. In a wheel for motor vehicles, a hub member formed of two parts, the inner part comprising a brake drum member formed with a central tubular portion and a web wall adapted to form a backing for a brake member proper, the outer part of said hub comprising a cylindrical portion adapted to engage over said tubular portion and provided with radially extending means adapted to lie flush against the peripheral portion of said web wall, a brake member proper of hard wear-resisting material engaged in said backing portion, and means for securing the parts in assembled relation.

9. A wheel for motor vehicles comprising an annular web wall having a peripheral backing portion adapted for engagement with a brake contacting member and a central enlarged tubular portion constituting the inboard hub barrel portion, an outboard hub member of suitable front axle type or rear axle type construction having a bore and radially extending means adapted for engagement with said inboard hub portion of the annular radial wall to complete the hub thereof, and a demountable tire-rim having rigid bolting-on means extended from the inboard side secured to the peripheral backing portion of the web wall and a brake contacting member fastened to the inboard side of said peripheral backing portion at the seating opposite to the seating of said tire-rim to complete the periphery of the wheel and for strengthening the position thereof for carrying load and resist driving strains exerted thereon.

10. A metal wheel assembly for motor vehicles comprising a demountable tire-rim, rim-carrying means secured to the inboard side of the base of said rim, a brake drum member of pressed sheet metal provided with a central tubular portion which constitutes the inner part of the hub barrel, a separate outboard hub member formed with a central tubular portion adapted to engage said first named tubular portion and complete the hub barrel, said member being provided with radially extending means adapted to engage the outboard face of the web wall, said tire-rim assembly and a brake contacting member being secured to the periphery of the wheel assembly at sides opposite to one another for completing the structure to resist driving strains directed thereagainst by driving force of the vehicle and means securing the parts together.

11. A wheel for motor vehicles comprising a demountable tire-rim having an integral intermediate base, mounting means of L-shape in cross section said mounting means being fastened to said intermediate base, an annular radial web wall having a peripheral backing flange adapted for engagement with a brake contacting member and a central enlarged tubular portion constituting the inboard hub barrel portion, and an outboard hub member having radially engaging means engaged with said inboard hub barrel portion to complete the hub of the wheel member, and a brake contacting member and said tire-rim assembly being detachably secured to the peripheral backing portion to complete the wheel.

12. A wheel assembly for motor vehicles comprising a demountable tire-rim having an integral intermediate base, mounting means of L-shape in cross section having an inboard side relatively long radial flange having bolt-passing means, said mounting means being fastened to said rim-base with said long radial flange forming bolting-on means, a brake drum member of pressed sheet metal formed with a peripheral web adapted to form a backing for a brake contacting member proper, a brake contacting member the consistency of which material is different than the material of the peripheral web and engaged in said backing portion, a central tubular portion extended axially-outwardly from the central part of said web wall and adapted to constitute the inner part of the hub barrel of the wheel member for engagement with the inner portion of either an outboard non-driven hub member or an outboard axle-driven hub member, an outboard hub member having radially extending engaging means and having its inner portion engaged with said inner hub barrel portion to complete the hub of the wheel member, and means completing the wheel assembly and mounting the tire-rim on the periphery of the web wall said tire-rim and said brake contacting member being secured to the peripheral portion of the wheel assembly to strengthen the radial line thereof.

13. A wheel member, in combination, for motor vehicles, comprising a tire-rim having rigid mounting means extended radially, a load supporting annulus comprising a radial wall and a central tubular inboard hub barrel portion, an outboard hub member having a central tubular portion and radially extended engaging means, said latter tubular portion being fastened to the outboard portion of said former tubular portion and said radially extended engaging means of the outboard hub member being fastened to the outboard face of the radial wall of the load supporting member, means adapted to assemble the parts to complete the wheel member, and a brake contacting member secured to the peripheral portion of the load supporting wall of the wheel member and said tire-rim being secured to the side of the peripheral portion of the wheel opposite to said brake contacting member for strengthening the position of the wheel.

14. A wheel member assembly, in combination, for motor vehicles, comprising a tire-rim having rigid mounting means radially extended, a tire-rim supporting body comprising an annulus formed with a central portion of an inward generally conical contour having centrally an axially-outwardly extended tubular flange and a radial wall extended from the peripheral edge of said conical portion and terminating in a peripheral backing portion for a brake contacting member proper, an outboard hub member formed with a peripheral portion of an outward generally conical contour having centrally an axially-outwardly extended tubular body, said outboard hub member and said conical portion of the annulus being assembled together to complete the hub of the wheel member assembly, and means adapted for completing the assembly for service with a vehicle.

15. An all-metal wheel assembly, in combination, for motor vehicles, comprising a brake drum member formed with a central axially-outwardly extended tubular flange, an outboard hub member formed with a central axially-outwardly extended tubular portion engaging the said tubular flange and having radially extended means engaging with and supporting the wall of the brake drum member thereby completing the hub and reinforcing the wall thereof, means fastening the parts together to complete the structure, and a demountable tire-rim mounted on the periphery of the brake drum member and having mounting means adapted to support and connect the rim with the brake drum member.

16. In a wheel, a wheel member supporting body comprising a plate formed with a web wall having a backing portion for engaging with a brake engaging member and a rim assembly constituting the periphery of the wheel, an axially enlarged outboard hub portion having a bore integrally extended from the center of said plate, an outboard member formed with a radial portion for engaging with the outboard face of said plate and an outboard hub portion integrally extended from the center of said outboard member and having a bore, and means adapted to fasten the parts together to form an enlarged frusto-conical contour having circularly a chamber between the inner faces of the parts completing said contour adapted to support load on and absorb shocks transmitted from the periphery of the wheel.

17. In a wheel assembly, an inboard load-carrying annulus comprising a sheet metal pressed member provided peripherally with a portion adapted for rigid engagement with a brake engaging member and a tire-rim assembly, an outboard integrally extended hub portion having a bore formed with the center of said member, a brake engaging member fastened to the inner face of said peripheral portion of the sheet metal member, a tire-rim assembly demountably secured to the outer face of said peripheral portion of the sheet metal member, an outboard member comprising a centrally formed axially-outwardly extended hub portion having a bore and a radially-outwardly flared portion, said hub portions engaging one another to complete a through bore adapted to retain operative members of a vehicle, and means adapted to fasten the parts together to include an axially enlarged central body capable of supporting load carried by and absorb shocks transmitted thereto from the periphery of the annulus.

18. In a combined wheel hub and brake drum-supporting structure, a central portion formed of tubular sections terminally secured together in substantial alignment, a flange carried by and projecting radially from one tubular section substantially at its juncture with the adjoining section, and a flange carried by and projecting from the adjoining section at its end remote from said juncture, the flanges converging toward an annular area spaced from the central section, and being secured together in said area.

19. In a combined wheel hub and brake-drum load-supporting structure, a central body formed of tubular sections terminally secured together in substantial alignment, a flange carried by and projecting radially from one tubular section substantially at its juncture with the adjoining section, and a flange carried by and projecting radially from the adjoining section at its end remote from said juncture, the flanges converging toward an annular area spaced from the central section, and being secured together in said area to form an annular channel between the parts, one of said flanges still continuing radially-outwardly to embody a radial wall terminating in a peripheral backing portion adapted for permanent engagement with a separately formed brake contacting member on one side and for demountable engagement with a tire-rim assembly 20. In a combined wheel hub and brake-drum load-supporting structure, a central body formed of tubular sections terminally secured together in substantial alignment to form a continuous axial bore therein, a flange carried by and projecting radially from one section substantially at its juncture with the adjoining section, and a flange carried by and projecting radially from the adjoining section at its end remote from said juncture, the flanges converging toward an annular area spaced from said central section, and being secured together in said area to form a closed annular channel between the inner faces of said aligned parts to lighten and strengthen said central body, one of said flanges continuing radially-outwardly to integrally carry a radial wall which is provided with a peripheral backing portion for permanent attachment thereto of a separately formed brake contacting member and demountable engagement of a tire-rim assembly for strengthening the structure to resist driving strains imposed thereon.

21. In a combined wheel hub and brake drum-supporting structure, a central portion formed of tubular sections terminally secured together in substantial alignment to form an axial bore therein, a flange carried by and projecting radially from one tubular section substantially at its juncture with the adjoining section, and a flange carried by and projecting radially from the adjoining section at its end remote from said juncture, the flanges converging toward an annular area spaced from the central section, and being secured together in said area to form a conical enlarged body having a closed annular channel between the inner face of said body to lighten and strengthen the supporting position thereof for resisting driving strains imposed thereon.

22. In a combined wheel hub and brake drum-supporting structure, a central portion formed of tubular sections terminally secured together in substantial alignment, a flange carried by and projecting radially from one tubular section substantially at its juncture with the adjoining section, and a flange carried by and projecting from the adjoining section at its end remote from said juncture, the flanges converging toward an annular area spaced from the central section, one of said flanges having a radial web wall having a portion comprising the radially outer periphery of the structure, said other flange having radially extending engaging means aligned in parallel with said wall, and means securing the parts together.

23. In a combined wheel hub and brake drum-supporting structure, a central portion formed of tubular sections terminally secured together in substantial alignment, a flange carried by and projecting radially from one tubular section substantially at its juncture with the adjoining section, and a flange carried by and projecting at its end remote from said juncture, the flanges converging toward an annular area, one of said flanges having a web wall having a portion comprising the periphery of the structure adapted to carry a brake engaging member, the other of said flanges having engaging means extending parallelly with said web wall and forming seats for demountable engagement of tire-rim mounting means, and means securing the parts together for completing the structure for service with a vehicle.

24. In a combined wheel hub and brake drum-supporting structure, a central portion formed of tubular sections terminally secured together by press-fit interlocking of the outboard-side portion of one tubular section with the inboard-side portion of the other tubular section to constitute a continuous axial rigid body having a continuous bearing and axle-retaining bore, a flange carried by and projecting radially from one tubular section at its juncture with the adjoining tubular section, and a flange carried by and projecting from the adjoining tubular section at its end remote from said juncture, the flanges extending to a suitable area spaced from the central section and secured together to constitute an axially and radially enlarged central body having an annular channel between the faces of the assembled parts circumferentially in relation to the annularity of said continuous bore.

25. In a combined wheel hub and brake drum-supporting structure, a radially and axially enlarged central body formed of opposed members each formed centrally with an axial outwardly extended tubular section having an axial bore, the said sections terminally press-fit interlocking one with another to constitute an axial continuous central body having the said axial bores continuously extended to constitute means of retaining bearing means and an axle-shaft including a lubricant for the bearing means and axle-shaft, the wall of one of the opposed members extending radially from its juncture with the axially-inward side of its tubular section, and the wall of the other opposed member extending from its juncture with the axially-inward side of its tubular section at the end of the section remote from the juncture of the tubular sections, the walls of both opposed members extending to a suitable locking position to complete the structure and embodying an annular channel between the opposed faces of the assembled parts circumferentially in relation with the annularity of the bore thereof to lighten and strengthen the radial position of said enlarged central body for carrying load and absorbing strains directed thereagainst.

26. In a combined wheel hub and brake drum-supporting structure, a radially and axially enlarged conical central body formed centrally with tubular sections terminally press-fit interlocked one with another to constitute axially a continuous rigid body having a continuous bore adapted for retaining in operative position bearing means and an axle-shaft, and including a lubricant on said bearing means and axle-shaft, and preventing the escape of said lubricant between the terminal engaging portions of the tubular sections, a flange carried by and projecting from one tubular section at its junction with the adjoining tubular section, and a flange carried by and projecting from the adjoining tubular section at its end remote from said junction, the flanges extending to a suitable annular locking area spaced from the central section of the structure and embodying an annular channeled space between the opposing faces of the assembled parts circumferentially with the annularity of the central bore therein, the radial and axial enlargement of the conical central body being formed for the purpose of lightening and strengthening the radial and axial positions thereof for suitably carrying load and resisting driving strains directed thereagainst.

RICHARD B. MILLER.

CERTIFICATE OF CORRECTION.

Patent No. 2,101,505. December 7, 1937.

RICHARD B. MILLER.

It is hereby certified that error appears in the printed specification of the above numbered patent requiring correction as follows: Page 3, first column, line 74, before the word "such" insert as; and second column, line 7, strike out "and"; page 4, second column, line 54, claim 10, after "vehicle" insert a comma; line 59, claim 11, after "section" insert a comma; page 5, first column, line 23, claim 12, after "wall" insert a comma; and that the said Letters Patent should be read with these corrections therein that the same may conform to the record of the case in the Patent Office.

Signed and sealed this 8th day of March, A. D. 1938.

Henry Van Arsdale,
Acting Commissioner of Patents.

(Seal)